(12) United States Patent
Hufenbach et al.

(10) Patent No.: US 10,479,031 B2
(45) Date of Patent: Nov. 19, 2019

(54) DEVICE AND METHOD FOR INFILTRATING A FIBER PREFORM

(71) Applicants: ThyssenKrupp Federn und Stabilisatoren GmbH, Hagen (DE); ThyssenKrupp AG, Essen (DE)

(72) Inventors: Werner Hufenbach, Dresden (DE); Martin Lepper, Dresden (DE); Jens Werner, Coswig (DE); Christian Koehler, Dresden (DE); André Bartsch, Dresden (DE)

(73) Assignees: THYSSENKRUPP FEDERN UND STABILISATOREN GMBH, Hagen (DE); THYSSENKRUPP AG, Essen (DE)

( * ) Notice: Subject to any disclaimer, the term of this patent is extended or adjusted under 35 U.S.C. 154(b) by 311 days.

(21) Appl. No.: 14/652,291

(22) PCT Filed: Dec. 6, 2013

(86) PCT No.: PCT/DE2013/100411
§ 371 (c)(1),
(2) Date: Jun. 15, 2015

(87) PCT Pub. No.: WO2014/094733
PCT Pub. Date: Jun. 26, 2014

(65) Prior Publication Data
US 2015/0343719 A1    Dec. 3, 2015

(30) Foreign Application Priority Data
Dec. 21, 2012  (DE) .................. 10 2012 112 939

(51) Int. Cl.
*B29C 70/54* (2006.01)
*B29C 70/48* (2006.01)
(Continued)

(52) U.S. Cl.
CPC ............ *B29C 70/446* (2013.01); *B29C 70/48* (2013.01); *B29C 70/542* (2013.01); *B29K 2105/08* (2013.01)

(58) Field of Classification Search
CPC ..... B29C 70/443; B29C 70/446; B29C 70/48; B29C 70/542; B29C 70/36; B29C 70/44; B29C 33/505
See application file for complete search history.

(56) References Cited

U.S. PATENT DOCUMENTS 5,221,391 A * 6/1993 Kittaka ................. B29C 53/566
156/171
5,316,462 A * 5/1994 Seemann ................ B29C 33/10
264/316

(Continued)

FOREIGN PATENT DOCUMENTS

CN    1280865 A    1/2001
DE    10157655 A1   6/2003
(Continued)

*Primary Examiner* — Joseph S Del Sole
*Assistant Examiner* — Mohamed K Ahmed Ali
(74) *Attorney, Agent, or Firm* — thyssenkrupp North America, Inc.

(57) ABSTRACT

The invention relates to a method and a device for infiltrating a fiber preform of a component of fiber composite material with a matrix material. On the method side, it is proposed that an elastic coating (3) is applied onto the fiber preform (1, 23, 37), wherein the elastic coating (3) is widened to form a gap space (22) between the fiber preform (1) and the coating (3). The matrix material (21) is then fed into the gap space (22) and the elastic coating (3) is subsequently pressed against the fiber preform (1, 23, 37). On the device side, it is claimed that an elastic coating (3) is arranged on the fiber preform (1, 23, 37) and means are provided, which are in operative connection with the elastic coating (3), by which the coating (3) can be widened while (Continued)

forming a gap space (22) between the fiber preform (1, 23, 37) and the coating (3). A matrix material (21) can be fed into the gap space (22) and the coating (3) can be pressed against the fiber preform (1, 23, 37).

20 Claims, 11 Drawing Sheets

(51) Int. Cl.
  *B29C 70/44* (2006.01)
  *B29K 105/08* (2006.01)

(56) References Cited

U.S. PATENT DOCUMENTS

| | | | |
|---|---|---|---|
| 5,685,525 A * | 11/1997 | Oguri | B29C 53/083 |
| | | | 267/148 |
| 5,904,803 A | 5/1999 | Hillerich et al. | |
| 6,454,251 B1 | 9/2002 | Fish | |
| 8,178,032 B2 | 5/2012 | Ruiz et al. | |
| 8,765,048 B2 | 7/2014 | Ruiz et al. | |
| 2006/0233907 A1* | 10/2006 | Ruiz | B29C 70/546 |
| | | | 425/387.1 |
| 2007/0063393 A1* | 3/2007 | Vernin | B29C 70/443 |
| | | | 264/511 |
| 2007/0175577 A1* | 8/2007 | Dagher | B29C 33/505 |
| | | | 156/229 |
| 2010/0276069 A1 | 11/2010 | Lengsfeld et al. | |
| 2011/0068514 A1 | 3/2011 | Ruiz et al. | |
| 2012/0217670 A1 | 8/2012 | Ruiz et al. | |
| 2014/0346715 A1 | 11/2014 | Lengsfeld et al. | |

FOREIGN PATENT DOCUMENTS

| | | |
|---|---|---|
| DE | 102007060029 A1 | 6/2009 |
| DE | 102010026165 A1 | 1/2012 |
| FR | 2828130 A1 | 2/2003 |
| WO | 2005000566 A1 | 1/2005 |

* cited by examiner

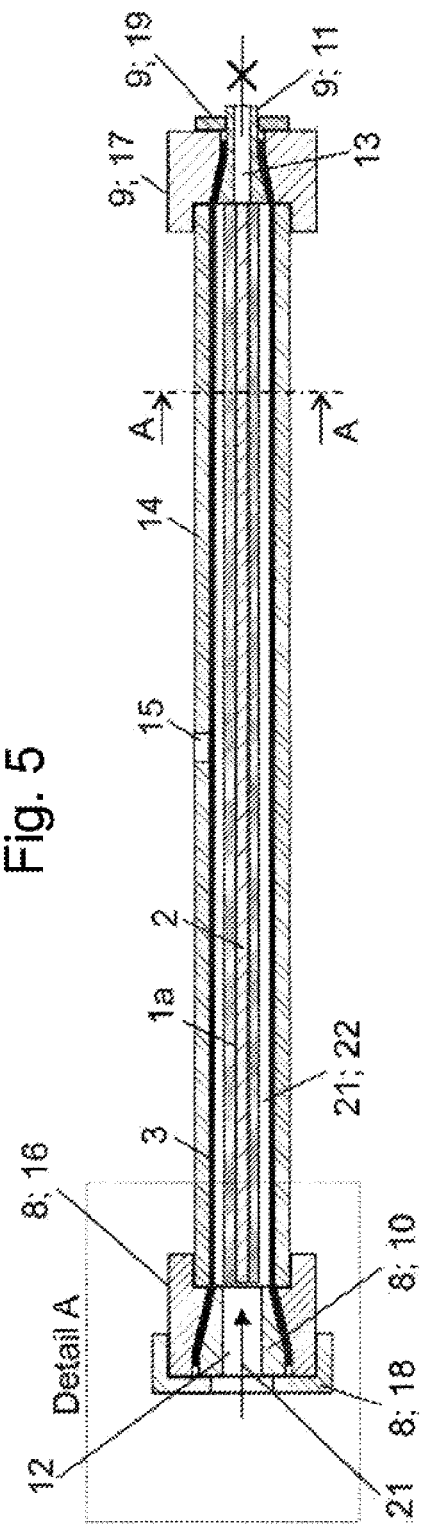
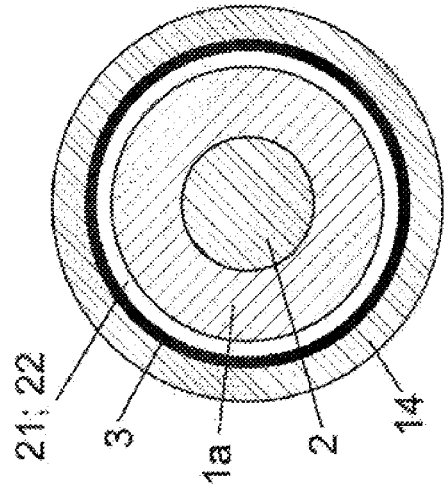
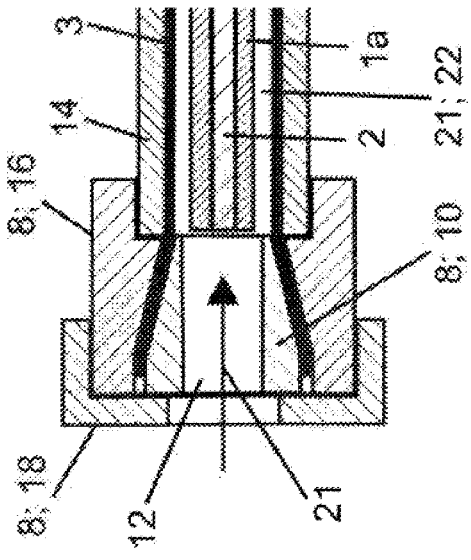

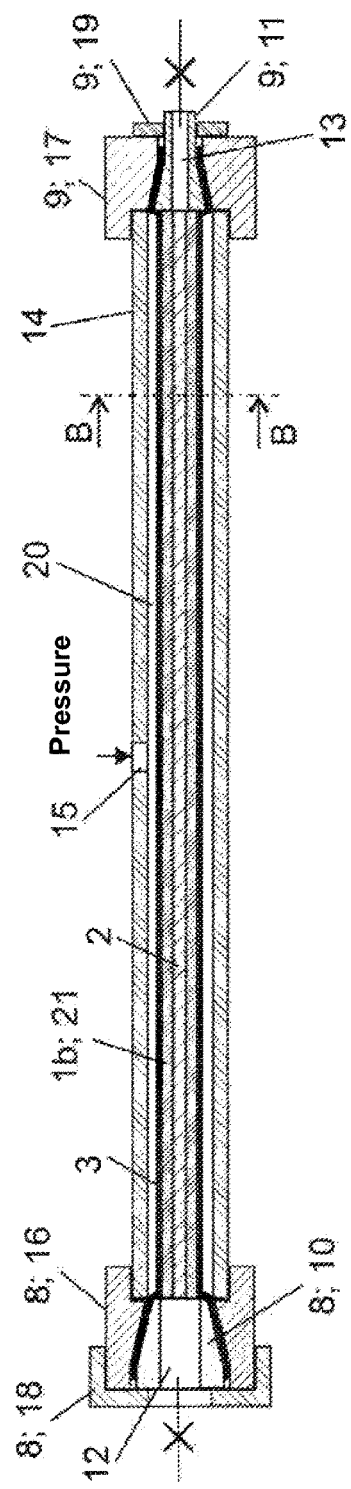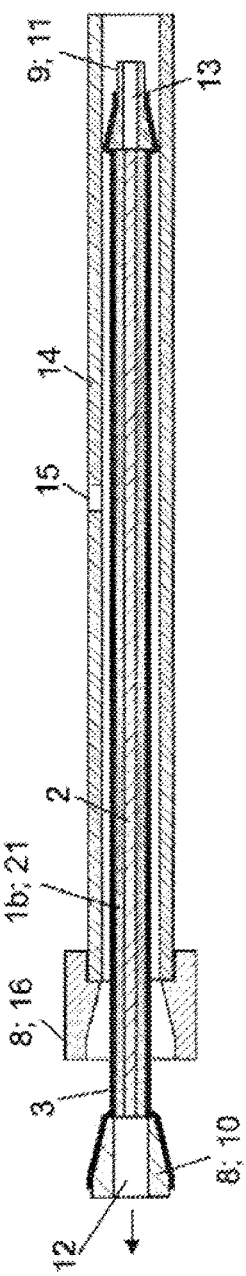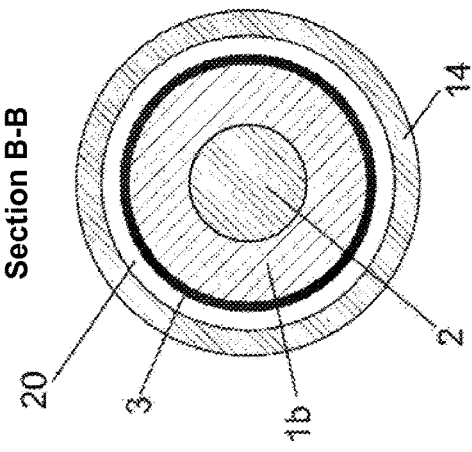

Section C-C

Detail A

Section D-D

Detail B

Section E-E

Section F-F

Section G-G

Section H-H

DEVICE AND METHOD FOR INFILTRATING A FIBER PREFORM

BACKGROUND OF THE INVENTION

1. Field of the Invention

The invention relates to a method and device for infiltrating a fiber preform of a component made of fiber composite material with a matrix material.

The method and the device for infiltrating a fiber preform is a component of a method and a device for the production of a component made of fiber composite material from this fiber preform.

2. Discussion of Background Information

Methods and devices for infiltrating a fiber preform are known as Resin Transfer Molding ("RTM") processes or devices, respectively, whereby a dry fiber preform is arranged within a closed mold and the resinous matrix material is injected into a cavity in the mold in order to impregnate the fiber preform with matrix material. Thereafter, the fiber preform is pressed and consolidated into the desired form via a mold.

In the case of the resin infusion method, a process related to the RTM method, the matrix material is drawn into the mold cavity, and thus into the fiber preform, with the assistance of a vacuum. In the case of fiber preforms with unusual shapes, in particular elongated fiber preforms, the method is particularly disadvantageous in that the matrix material must cover the entire length of the fiber preform in its longitudinal direction in order to impregnate the entire preform with matrix material. The infiltration process is thus very time-consuming. This method is not suited for elongated fiber preforms due to the lengthy infiltration times.

Fiber preforms with unusual shapes infiltrated and molded using the Resin Transfer Molding ("RTM") method additionally require expensive molds. Fouling of the molds by the liquid resin system prevents smooth, continuous production runs.

A method and a device for producing components from fiber composite materials is known from publication DE 101 57 655 AI according to which a preformed, existing fiber preform is impregnated using the resin infusion method by means of an adjustable opening. As part of this method, the fiber preform is sealed tightly by at least two outer, movable mold parts. The mold components are separated subject to the creation of openings to the fiber preform. A vacuum is applied to cavity of the mold tools whereupon the impregnation resin is injected into the gaps and thereafter the mold tools are again moved together in order to impregnate the fiber preform and to eliminate excess impregnation resin from the gaps.

It may be the case that infiltration times may be reduced in this manner, however, it is disadvantageous that, for purposes of creating a defined geometric opening, the mold tools must reflect the component geometry of the fiber preform in a manner that is resource-intensive from a technical and design standpoint; from an economic standpoint, the gap impregnation process is thus primarily suited to large-scale, flat preforms. In addition, in order to adjust the gaps, resource-intensive control mechanisms are needed in order to operate the outer mold parts.

Fiber preforms for components with unusual shapes, for example for the production of springs, are thus mostly impregnated with matrix material by conventional means prior to being placed in a mold, which however entails more complicated handling during the subsequent molding process. The impregnated fiber preforms may, for example due to their wet, drop-forming state, hardly be stored temporarily and produce significant soiling of the molding and consolidation tools.

SUMMARY OF THE INVENTION

The primary object of the present invention is to improve the method and device for infiltrating fiber preform of the type described above, in particular to create a method and a device which enables the infiltration of molded fiber preforms at lower technical and engineering expense subject to the assurance of short infiltration times.

This object is accomplished according to the present invention via a method with the characteristics of patent claim 1.

According to the invention, it is proposed that
an elastic overlay be applied to the fiber preform,
the elastic overlay be expanded so as to create a gap between the fiber preform and the overlay, the matrix material be introduced into the gap and
thereafter, the elastic overlay be pressed onto the fiber preform.

According to the invention, the method uses an elastic overlay as a flexible infiltration tool. The overlay is applied to or around the fiber preform, whereby the overlay encompasses the fiber preform. The overlay is expanded by creating a gap between the fiber preform and the overlay. This may be accomplished by the liquid matrix material itself in that such material is conveyed under pressure by the matrix material feeder mechanism between the fiber preform and the loosely-fitting elastic overlay, whereby the overlay is expanded and a gap is created between the fiber preform and the expanded overlay. The expansion of the overlay and creation of the gap may however also be accomplished independently of the matrix material by the application of another agent directly to the overlay. Such agent may be electrical, pneumatic or hydraulic in nature. Injecting the liquid matrix material into the gap once created distributes the matrix material very quickly over the surface of the fiber preform and coats it entirely.

The elastic overlay is subsequently pressed onto the fiber preform, which may for example be accomplished by the application of negative supply pressure from the matrix material feeder mechanism so that the overlay is uniformly sucked onto the component geometry of the fiber preform.

The overlay may also be pressed onto the component geometry of the fiber preform with another agent directly applied to the overlay, e.g. electrical, pneumatic or hydraulic in nature, in the process of which the overlay of the fiber preform is likewise uniformly pressed onto the component geometry of the fiber preform.

The uniform application of the flexible overlay to the component geometry of the fiber preform results in the infiltration of the matrix material via the shortest route possible toward the surface normal in the center of the fiber preform.

In the case of the method according to the invention, no outer molds that have been specifically fitted to the component geometry are required. The matrix material is located with the space between the overlay and the fiber preform and does not come into contact with the environment and any auxiliary agents potentially in use.

Accordingly, liquid matrix material cannot result in any contamination.

Following infiltration, the fiber preforms are—protected by the overlay—easily workable and storable for further processing.

This results in a clean, efficient and accelerated infiltration method for impregnating preforms, in particular for the impregnation of preforms with unusual geometries, for example profile rods or spiral geometries. The infiltration process may be applied economically to the infiltration of all preformed fiber preforms.

Advantageous embodiments and further configurations of the method according to the invention are described in dependent patent claims and in the following description and the associated drawings.

A tubular, elastic overlay is used preferably that completely encompasses the fiber preform. The uniform and complete application of the flexible tube to the fiber preform component geometry results in the infiltration of the matrix material via the shortest route possible, and entirely radially, toward the surface normal in the center of the fiber preform. This further accelerates the infiltration of the fiber preform. The method subject to the use of a tube additionally simplifies sealing needs and reduces potential corrosion sites and the risk of contamination.

For purposes of carrying out the method according to the invention using a tube as an overlay, the tube is first applied to the fiber preform. Based on a preferred embodiment, this is accomplished such that the elastic tube is mounted on a hollow profiled structure, the fiber preform is introduced into clear opening of the structure, a tube end is affixed to the fiber preform and the structure is withdrawn from between the fiber preform and the tube. This permits the fiber preform to be encompassed by the elastic tube in a simple and uncomplicated manner, especially as the tube enclosing the fiber preform need not itself exert any pressure on the fiber preform for purposes of the infiltration method according to the invention and only needs to be loosely placed on the component geometry without being molded to the contours.

Preferably, an internal, pressure-tight system is created between the fiber preform and the overlay. This internal, pressure-tight system permits the creation of a specific amount of pressure in the space between overlay and fiber preform during the introduction of the matrix material which enables such material to be distributed uniformly and permits the creation of a gap. In this manner, the introduction of the matrix material may, for example, be accelerated through the creation of lower pressure in the gap in relation to the pressure of the matrix material flowing in.

This is particularly advantageous in this regard if, prior to the introduction of the matrix material into the gap, the fiber preform is evacuated by means of an internal, pressure-tight system. This permits unwanted air inclusions to be removed from the fiber preforms that are inconvenient when injecting the matrix material into the gap and the subsequent impregnation of the fiber preform. The speed and the quality of the impregnation are improved as a result.

Pursuant to an additional advantageous embodiment of the invention, an external, pressure-tight closed system is created between a pressure chamber that houses the fiber preform and the overlay.

By means of this external, pressure-tight system, a specific amount of pressure may be established within the pressure chamber, and thus in the external environment of the overlay, with which, inter alia, the expansion of the overlay may be influenced and the creation of the gap may be regulated. Thereafter, the inflow of the liquid matrix material flowing into the gap may be influenced. In addition to air, oil or water are preferred alternate pressure media for the pressure chamber. Oil or water as nearly incompressible pressure media for the external, pressure-tight system reduce delay in control when creating the gap.

Preferably, the gap between the fiber preform and the overlay is created such that positive pressure is created in the internal, pressure-tight system in relation to the pressure in the external pressure-tight system. As a result, the expansion of the overlay is facilitated and, in particular, low-resistance and fast injection of the liquid matrix material into the gap that has been created is made possible.

According to an additional preferred embodiment, the elastic overlay is pressed onto the fiber preform in that positive pressure on the part of the pressure medium in the external, pressure-tight closed system is created in relation to the pressure in the internal, pressure-tight closed system. The pressure ratios result in the comprehensive contraction of the flexible overlay and the concurrent pressing of the overlay onto the component geometry of the fiber preform with the advantageous impregnation effect described above.

An especially advantageous embodiment of the method according to the invention provides that the fiber preform to which the overlay is to be applied and which is encompassed by the tube, is arranged on a mold evacuated. The clean infiltration of the fiber preform according to the invention may thus be performed directly on the molding core used to mold the fiber preform whereby the process steps for impregnating and shaping are combined subject to the utilisation of the advantages according to the invention, which results in the significant optimisation of the process.

In the case of an additional advantageous embodiment of the method according to the invention, the fiber preform, prior to the application of the elastic overlay, preferably before the application of the tube, is arranged on a mold. In the case of this embodiment as well, the process steps for impregnating and molding are advantageously combined.

In an advantageous continuation of the embodiment described above, the overlay arranged on the mold is joined to the mold in a pressure-tight manner. This permits the mold to concurrently function as a seal for the flexible mold or if applicable a seal for the pressure chamber. An overlay that completely encompasses the mold may be dispensed with yielding a savings in materials. In addition, the overlay to be applied to the mold need not be expanded in order to apply it to the fiber preform.

In addition, the object is accomplished by means of a device with the characteristics described in the appended claims.

According to the invention, it is proposed that the an elastic overlay be arranged on the fiber preform and that agents that have an operative connection to the elastic overlay are provided for by means of which the overlay is expandable subject to the creation of a gap between the fiber preform and the overlay, a matrix material may be introduced into the gap and the overlay may be pressed on to the fiber preform.

In contrast to the known, resource-intensive gap impregnation process, this device uses a flexible overlay as an aid to creating a gap and infiltrating matrix material from the gap into the fiber preform.

The matrix material may flow rapidly into the gap by means of the flexible overlay and be infiltrated via the shortest route possible toward the surface normal in the center of the fiber preform.

The agents with an operative connection to the elastic overlay in this context may be easily engineered.

The device does not need any special molds tailored to the component geometry. The matrix material remains within the overlay and does not come into contact with parts of the device or with devices used in subsequent operational steps.

This results in a device for the implementation of a clean, efficient and fast-acting infiltration process for impregnating preforms, in particular for the impregnation of preforms with unusual geometries, for example profile rods or spiral geometries.

Advantageous embodiments and further configurations of the method according to the invention are described in dependent patent claims and in the following description and the associated drawings.

An advantageous intake device for the device according to the invention facilitates the application of the tubular, elastic overlay to the fiber preform so that the fiber (1, 23, 37) is arranged directly in the elastic tube (3). The tube acts advantageously as an entirely encompassing aid to infiltration and molding.

These and additional characteristics described in the patent claims, the description of possible embodiments and the drawings may each for themselves or in combination be realised as advantageous embodiments of the invention for which protection is being applied for here.

BRIEF DESCRIPTION OF THE DRAWINGS

Three illustrative embodiments of the method according to the invention and the associated devices for filtration of the respective fiber preforms for the production of a shaft, a spring and an Omega section of fiber composite material are described in more detail. The associated drawings illustrate in schematically in FIG. 1 a sectional view of an intake device for the application of an elastic, tubular overlay to a rod-shaped fiber preform for the production of a shaft;

FIG. 5 a sectional view of the arrangement depicted in FIG. 4 during a second infiltration phase;

FIG. 6 a detailed view A of the arrangement during the second infiltration phase depicted in FIG. 5;

FIG. 7 a cross-sectional view of the rod-shaped fiber preform during the second infiltration phase according to FIG. 5;

FIG. 8 a sectional view of the arrangement depicted in FIG. 4 during a third impregnation phase;

FIG. 9 a cross-sectional view of the rod-shaped fiber preform during the third infiltration phase according to FIG. 8;

FIG. 10 a sectional view of the arrangement during the removal of the tube-encompassing rod-shaped fiber preform from the pressure chamber after infiltration;

DETAILED DESCRIPTION OF EMBODIMENTS OF THE INVENTION

The first illustrative embodiment pursuant to FIGS. 1 to 10 describes the method according to the invention and the associated devices for the filtration of a rod-shaped fiber preform 1 for the production of a shaft.

For purposes of the production of the rod-shaped fiber preform 1, fibers are arranged on a dimensionally stable core element 2 with a round cross-section based on a known process not described here. Subsequently, a tubular, elastic overlay, described hereinafter as an elastic tube 3, potentially out of silicon, is applied to the rod-shaped fiber preform 1.

Figure 1:
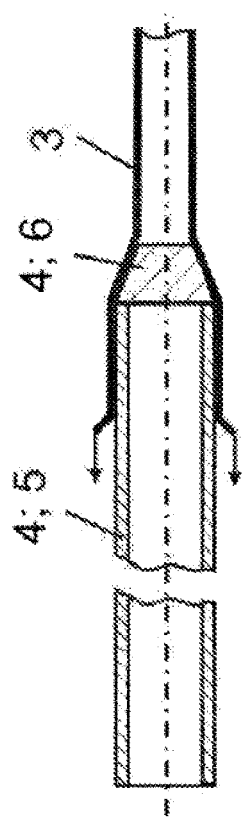

FIG. 1 illustrates an intake device 4 for the application of the elastic tube 3 onto the rod-shaped fiber preform 1. The intake device 4 comprises a tubular auxiliary body 5 and a clamping cone 6. During the first phase of application, the elastic tube 3 is drawn over the tube-shaped auxiliary body 5 with the aid of the clamping cone 6 so that the tube completely covers the auxiliary body 5.

Figure 2:
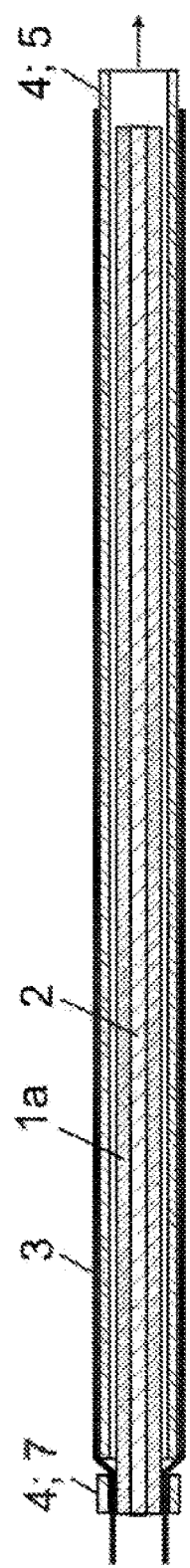
FIG. 2 a sectional view of an intake device in a second application phase.

During a second phase of application depicted in FIG. 2, the fiber preform 1 is introduced into the rod-shaped auxiliary body 5. The auxiliary body 5 is of sufficient length and thus such a large cross-section so that the fiber preform 1 may be easily and wholly placed within the auxiliary body 5. The tube 3 is affixed to the fiber preform 1 at the end by means of a hose clamp 7 and the auxiliary body 5 and is drawn in relative displacement to the tube 3 and to the fiber preform 1, whereby the tube 3 is affixed to the fiber preform 1.

Figure 3:
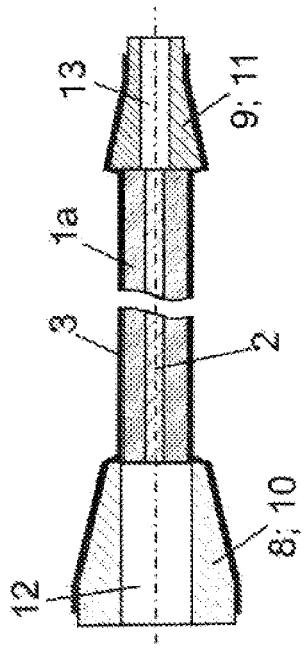
FIG. 3 a sectional view of the tube-encompassing, rod-shaped fiber preform with connecting pieces on the casting side and on the riser side.

Both ends of the tube 3 depicted in FIG. 3 are each applied to a conical base 10, 11 of a three-part connecting support 8, 9 so that the conical bases 10,11 of the connecting pieces 8, 9 lead into the tube 3 and are connected to the fiber preform 1 at each respective end. The bases 10, 11 of the connecting pieces each have a centrally arranged, closable line comprising the casting 12 and riser side 13 connections.

Figure 4:
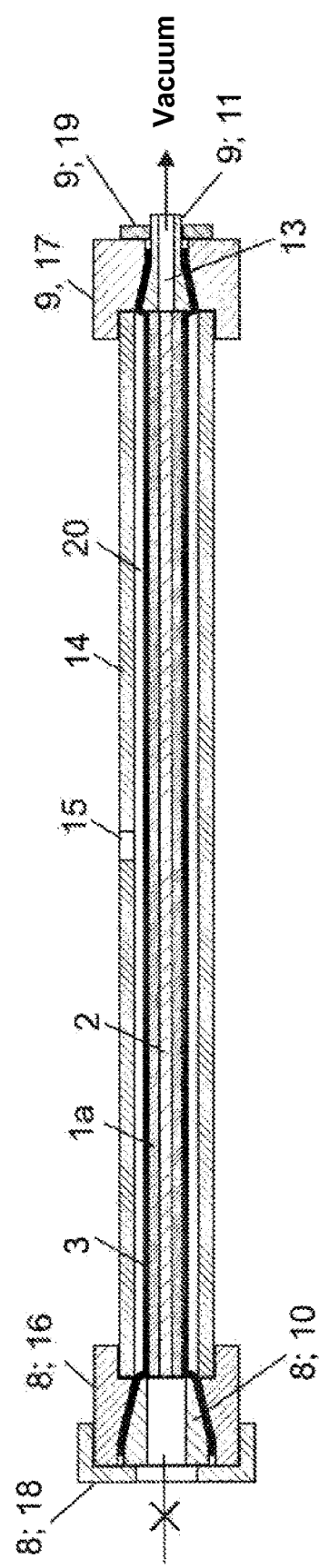
FIG. 4 a sectional view of the arrangement of the tube-encompassing, rod-shaped fiber preform depicted in FIG. 3 in a pressure chamber during a first infiltration phase.

Thereafter, the fiber preform 1, equipped in the manner described above and encompassed by the tube 3 pursuant to FIG. 4 is introduced into a tubular pressure chamber. The tubular pressure chamber 14 includes a closable opening 15 approximately in the middle of its longitudinal axis.

The conical bases 10, 11 of the connecting pieces 8, 9 are attached to corresponding conical upper sections 16, 17 of the connecting pieces 8, 9, which in turn are tightly connected to the tubular pressure chamber 14. The conical upper sections 16, 17 may be connected with sealing connections or affixed tightly to the pressure chamber 14. By means of a tensioner 18, 19 on the connecting pieces 8, 9, the tube ends are clamped tightly together between the conical base 10, 11 and the conical upper section 16, 17 of the connecting pieces 8, 9.

The fiber preform encompassed by the tube 1, 3 is thus arranged in a pressure pressure-tight manner against the tubular pressure chamber 14. The space 20 within the pressure chamber 14 contains any desired pressure medium, for example air as show here. The closable opening 15 of the pressure chamber 14 is, depending on the process phase, open, closed or pressurised to a specific extent by means of a pump not depicted here, whereby an external, pressure-tight closed system is created between the tube 3 of the tube-encased fiber preform 1, 3 and the pressure chamber 14.

FIG. 4 depicts the arrangement of the tube-encased, rod-shaped fiber preform 1 in the pressure chamber 14 during a first infiltration phase during which the fiber preform is evacuated. For such purposes, the casting line 12 is closed and the riser line 13 is attached to a vacuum pump not depicted here which is activated whereby an internal, pressure-tight closed system is between the fiber preform 1 and the tube 3 in which a vacuum is created.

During this process step, the opening of the pressure chamber 14 is open to the environment so that the pressure chamber 14 is subject to ambient pressure.

This creates negative pressure within the internal, pressure-tight closed system in relation to the pressure chamber 14 and/or the environment or, respectively, positive pressure in the pressure chamber 14 in relation to the pressure in the internal, pressure-tight closed system. Evacuating the internal, pressure-tight closed system draws the tube 3 toward to the rod-shaped fiber preform 1 and all air inclusions are removed from the permeable structure of the fiber preform 1.

For purposes of facilitating evacuation, the pressure within the pressure chamber 14 may be increased to a specific, higher pressure in relation to the ambient pressure via the opening 15 so that the pressure differential between the external, pressure-tight closed system and the internal, pressure-tight closed system increases. This accelerates the evacuation process.

During the next infiltration phase depicted in FIG. 5, the riser line 13 is closed and liquid matrix material 21, for example a liquid resin system, is introduced via the casting 12 with positive pressure in relation to the vacuum and the pressure in the internal, pressure-tight system between tube 3 and the fiber preform 1. FIG. 6 depicts the casting side 12 of the device depicted in FIG. 5 with the casting-side connecting pieces 8 in an enlarged detailed sectional view A. The connecting line 12 of the base 10 of the connecting piece 8 exhibits a larger diameter than the exterior diameter of the fiber preform 1 so that an annular gap is created between the casting line 12 and the fiber preform 1 through which the matrix material 21 is able to flow between the tube 3 and the fiber preform 1.

During this process phase, the opening 15 of the pressure chamber 14 is open in relation to the environment so that ambient pressure prevails within the pressure chamber 14 and, as a result of the pressurised, inflowing matrix material 21, positive pressure prevails in the internal, pressure-tight closed system in relation to the pressure in the external pressure-tight system.

This results in the radial expansion of the tube 3, whereby a longitudinal annular gap 22 is created concentrically around the rod-shaped fiber preform 1 which very quickly fills with matrix material 21 along the entire length of the fiber preform 1. This gap 22 is depicted very clearly in the view shown in FIG. 7 which presents a sectional view A-A of the device in accordance with FIG. 5.

In order to facilitate the creation of the gap, the pressure chamber 14 may, via the opening 15, be subject to additional negative pressure in relation to the ambient so that the pressure differential between the external, pressure-tight closed system and the internal, pressure-tight closed system increases. The process of injecting matrix material 21 into the gap is thus accelerated.

The expansion of the tube 3, and thus the size of the gap 22, may be regulated via the pressure differential created between the pressure in the pressure chamber 14 of the external pressure-tight closed system and the pressure of the matrix material 21 in the space 22 of the internal, pressure-tight closed system.

In this manner, the tube 3 may be expanded to the maximum extent such that it touches the internal wall of the tubular pressure chamber 14, as depicted in FIG. 5. Accordingly, the pressure chamber 14 thus dictates the maximum size of the longitudinal annular gap 22.

The casting line 12 and the riser line 14 are closed in a third infiltration phase depicted in FIG. 8. The pressure chamber 14 is then subject to pressure via the opening 15 that is higher than the pressure in the gap 22. This results in a radially-aligned contraction of the tube 3, as is visible in the cross-section view in FIG. 9 (cross-section B-B) of the tube-encased fiber preform 1, 3 of the device according to FIG. 8. The tube 3 is pressed along the entire surface of the circumference and length of the fiber preform 1, whereby the fiber preform 1 is impregnated with matrix material 21 uniformly in a radial direction in relation to its central axis. The liquid matrix material 21 is infiltrated along the shortest possible path into the fiber preform 1 very quickly and is thus very intensive and efficient.

FIG. 10 depicts how the impregnated, tube-encased fiber preform 1, 3 is removed from the tubular pressure chamber 14 following infiltration. The internal and external pressure system must be de-pressurized for this purpose and the connecting pieces 8, 9 must be released. Thereafter, in a follow-on processing device not depicted here, for example in a curing oven, fiber preform 1 is consolidated and thus the shaft of fiber composite material is completed.

During infiltration, the tubular pressure chamber 14 has no contact at all with the liquid resin system and is directly available for a subsequent infiltration run in a clean state.

Similarly, the next follow-on processing device is likewise not soiled by the liquid resin system.

As a flexible tool and aid to performing the infiltration process, the tube 3 may be left on the finished shaft as a protective casing or may alternatively be removed depending on the particular use.

Depending on the particular use, the core element may also be removed so that a sleeve shaft of fiber composite material is created.

The second illustrative embodiment pursuant to FIGS. 11 to 19 describes the method according to the invention and the associated devices for infiltrating a rod-shaped fiber preform 23 for the production of a spring.

The method and the device according to the second illustrative embodiment differ in relation to the first illustrative embodiment primarily in the arrangement of a tube-encased, rod-shaped fiber preform 23 onto a mold 24 during the infiltration processing a cylindrical pressure chamber 25. Please refer to the description contained in the first illustrative embodiment with regard to identical process steps and device components.

In order to avoid repetition, only those characteristics and components that differ will be described below. Components that are used repeatedly with the same function have the same reference number.

Figure 11:
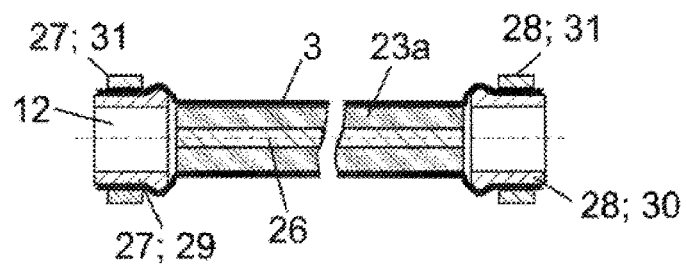
FIG. 11 a sectional view of a rod-shaped fiber preform encompassed by a tube for the production of a spring with casting side and riser side connecting pieces.

FIG. 11 depicts in part a longitudinally arranged, rod-shaped fiber preform 23 that is created through the application of fibers to a flexible core element 26. The fiber preform 23 is encompassed by an elastic tube 3 that was applied in accordance with FIGS. 1 and 2.

Both ends of the tube 3 are affixed to a cylindrical base 29, 30 of a two-piece connecting piece 27, 28 so that the bases 29, 30 of the connecting pieces 27, 28 lead into the tube 3 and are connected to the fiber preform 1 at each respective end. Bases 29, 30 of the two-piece connecting piece 27, 28 each have a centrally-arranged, closable casting line 12 and riser line 13.

By means of respectively identical upper sections 31 on the connecting pieces 27, 28 in the form of a hose clamp 31, the tube ends are affixed firmly to the cylindrical bases 29, 30 of the 27, 28.

Figure 12:
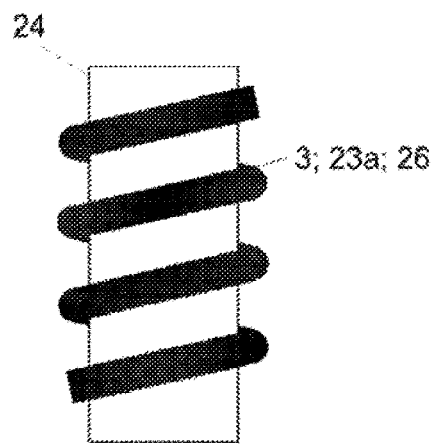
FIG. 12 a lateral view of the rod-shaped fiber preform wound around a mold core and encompassed by a tube.

The tube-encased, rod-shaped fiber preform 23, 3 is then wound onto the cylindrical mold core 24 depicted in FIG. 12. The mold core 24 preferably has a spiral-shaped groove 32 (visible in FIG. 15) so that the shape of the wound fiber preform 23 is optimally fit to the final shape of the coil spring.

Figure 13:
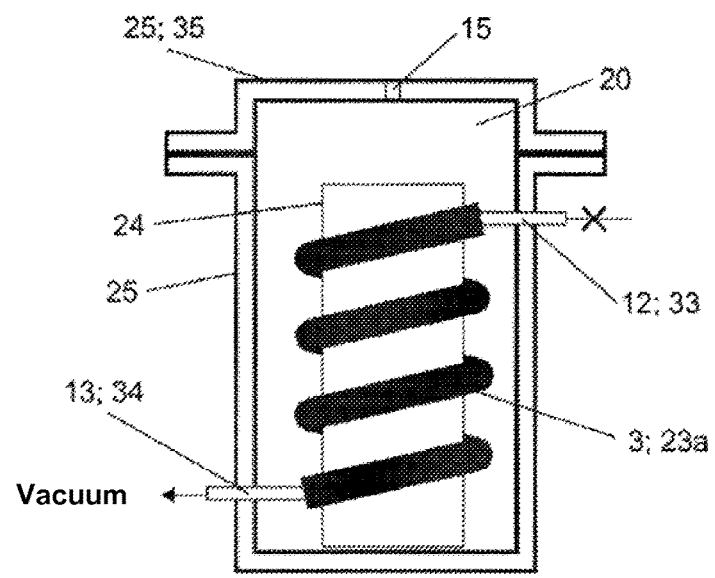
FIG. 13 a sectional view of the arrangement of the mold core depicted in FIG. 12 in a pressure chamber during a first infiltration phase.

The mold core 24 with the wound tube-encased fiber preform 23, 3 is thereafter placed into the cylindrical pressure chamber depicted in FIG. 13. The casting line 12 and the riser line 13 are attached to the extension feeder lines 33, 34 which extend through the cylindrical pressure chamber 25 and are tightly connected to the housing of the pressure chamber 25. The tube-encased fiber preform 23, 3 molded around the mold core 24 is thus in pressure-tight relationship to the cylindrical pressure chamber 25. The pressure chamber 25 may be tightly closed via a lid 35 that is outfitted with the opening 15 that may be locked or opened with pressure as applicable. The space within the pressure chamber 25 is filled with air as a pressure medium. This creates an external, pressure-tight closed system between the tube and the tube-encased fiber preform 23, 3 and the pressure chamber 25.

FIG. 13 depicts the arrangement of the tube-encased, rod-shaped fiber preform 23, 3 in the cylindrical pressure chamber 25 during a first infiltration phase during which they would fiber preform 23 is evacuated. For this purpose, a casting-side feeder line 33 is closed and a vacuum pump not depicted here is operated on the riser-side feeder line 34, whereby an internal, pressure-tight closed system is created in the tube 3 by means of a vacuum.

Pressure levels within the internal and external pressure systems are set according to the first illustrative embodiment depicted in FIG. 4.

During evacuation, the tube 3 is pressed onto the rod-shaped fiber preform 23 and all air inclusions are removed from the permeable structure of the fiber preform 23.

Figure 14:
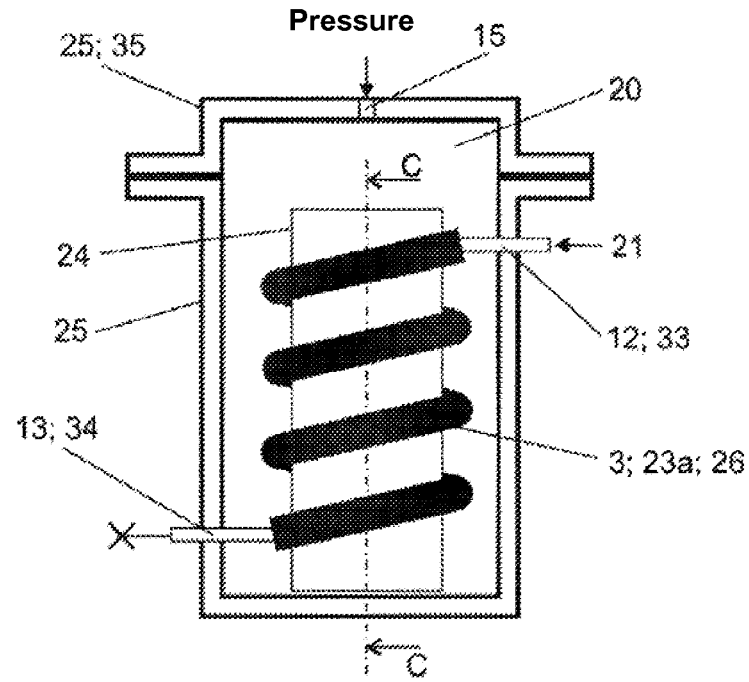
FIG. 14 sectional view of the arrangement depicted in FIG. 13 during a second infiltration phase.

During a second infiltration phase depicted in FIG. 14, the riser-side feeder line 34 is closed and the liquid resin system is conveyed into the internal, pressure-tight system between the tube 3 and fiber preform 23 by means of positive pressure in relation to the vacuum and the pressure in the pressure chamber 25.

The pressure chamber 25 is likewise subject to pressure via the opening 15 so that the expansion of the tube 3, and thus the size of the gap 22, may be regulated via the difference between the pressure in the pressure vessel 25 of the external, pressure-tight closed system and the pressure of the matrix material within the gap in the internal, pressure-tight closed system.

As a result of the positive pressure in the internal pressure system, the elastic tube 3 is radially expanded in an area that is not in contact with the mold core 24 creating an arch-shaped, gap 22 longitudinally along the coil-shaped fiber preform 23 that is filled with matrix material 21 along the entire length of the fiber preform 23. This process may be readily seen in FIG. 15, which depicts the mold core 24 with the wound fiber preform 23 during the infiltration phase depicted in FIG. 14 in a somewhat enlarged detailed sectional view C-C.

Figure 15:
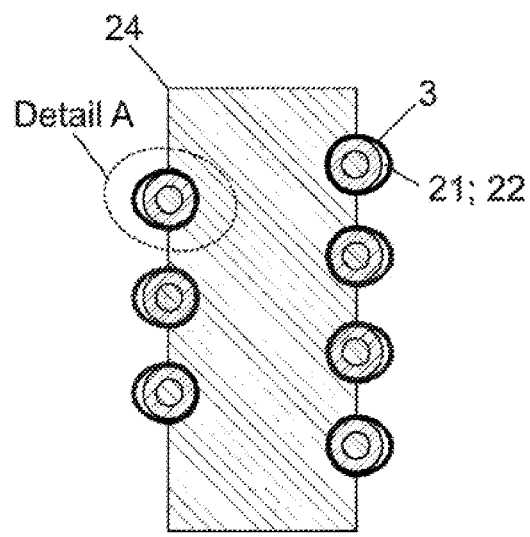
FIG. 15 a longitudinal view through the filled mold core during a second infiltration phase depicted in FIG. 14.
Figure 16:
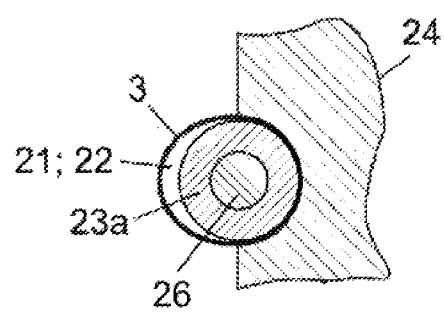
FIG. 16 a detailed view B of the filled mold core during the second infiltration phase depicted in FIG. 14.

FIG. 16, detailed view B depicts a greatly enlarged section of the filled mold core 24 depicted in FIG. 15, in which the cross-sectionally arch-shaped gap 22 between the fiber preform and the elastic tube 3 filled with matrix material 21 may by readily seen.

Figure 17:
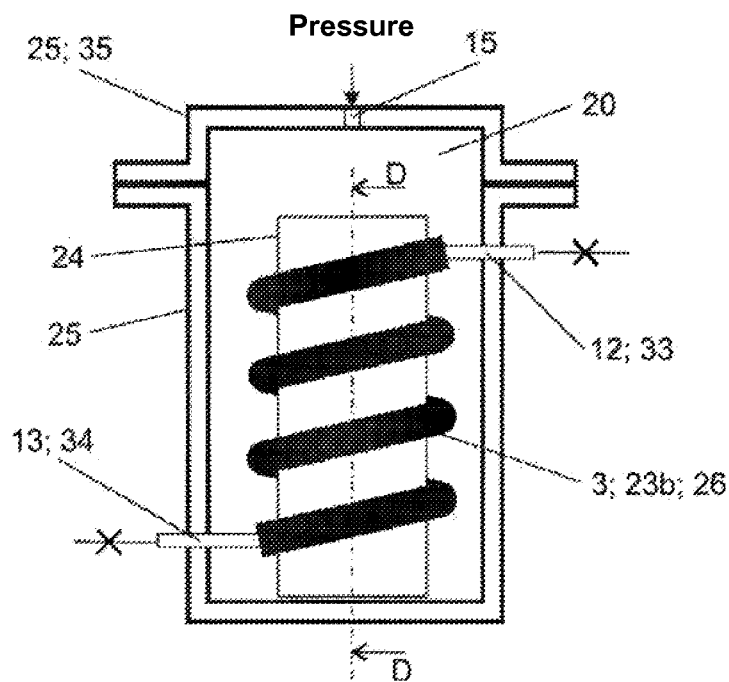
FIG. 17 a sectional view of the arrangement depicted in FIG. 13 during a third impregnation phase.
Figure 18:
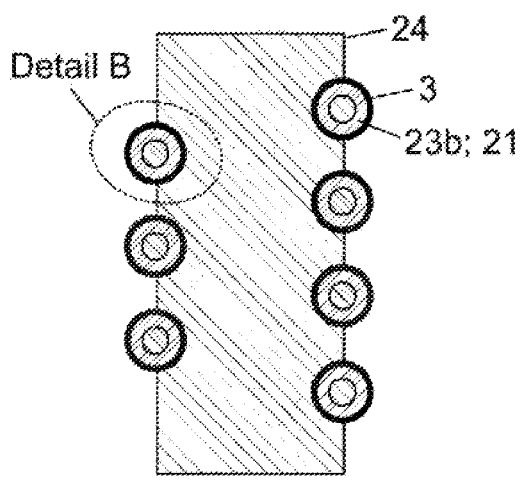
FIG. 18 a longitudinal view through the filled mold core during a third infiltration phase depicted in FIG. 17, FIG. 19 a detailed view C of the filled mold core during the third infiltration phase depicted in FIG. 17.
Figure 19:
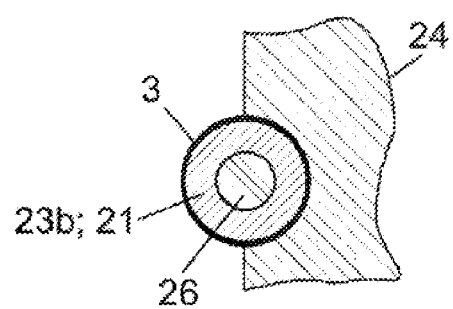

During a third infiltration phase depicted in FIG. 17, both feeder lines 33, 34 are closed. Positive pressure in the cylindrical pressure chamber 25 in relation to the pressure in the gap 22, created via the opening 15 in the lid 35 of the pressure chamber 25 subsequently causes a radially-arranged constriction of the tube 3 until it touches the coil-shaped fiber preform 23 along the entire length of the fiber preform 23, as depicted in the cross-section view in FIG. 18 (cross-section D-D) and detailed view C in FIG. 19. Whilst the tube 3 is being pressed, the coil-shaped fiber preform 23 is uniformly impregnated with matrix material 21 along its entire length in a radial relationship to its center.

Following infiltration, the impregnated fiber preform 23 is removed from the pressure chamber 25 with the mold 24 and placed into curing oven not depicted here for consolidation. The finished springs of fiber composite material are removed from the mold core after curing.

As is likewise the case with the mold core 24, the cylindrical pressure chamber 25 does not come into contact at all with the liquid resin system during infiltration and curing. They are immediately available without contamination for the next molding and infiltration process.

Depending on the intended use, the tube 3 may remain as a protective casing on the finished spring or may be removed. Similarly, the flexible core element 26 may be removed, thereby creating a hollow spring.

A third illustrative embodiment according to FIGS. 20 to 24 describes the method according to the invention and the associated devices by means of which, in contrast to the second illustrative embodiment, correspondingly-shaped fiber preform 37 arranged on an Omega section-shaped mold core 36 is infiltrated in a pressure vessel 38 for the production of an Omega section made of fiber composite material.

In order to avoid repetition, only those characteristics and components that differ will be described below. Please refer to the description contained in the first and second illustrative embodiments with regard to identical process steps and device components. Components that are used repeatedly with the same function have the same reference number.

The Omega section-shaped mold core 36 is first filled with a dry, sheet-shaped fiber preform in a process not depicted here.

Analogous to application process depicted in FIGS. 1 and 2, an elastic tube 3 is placed over the mold core 36 and the fiber preform 37. In contrast to the illustrative examples described above, the tube 3 covers both the fiber preform 37 and the mold core 36. Accordingly, the tube 3 is expanded such that it may accept the fiber preform 37 and the mold core 36.

Figure 20:
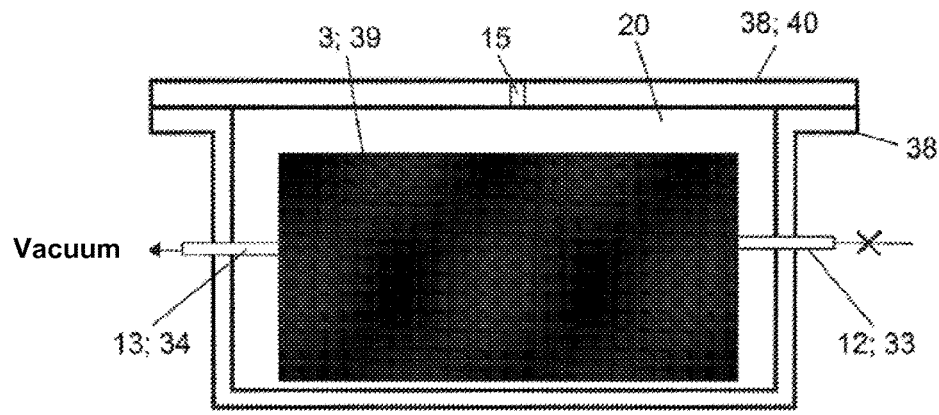
FIG. 20 a sectional view of an arrangement of a fiber preform/mold core unit encompassed within an elastic, tubular overlay within a pressure vessel during a first infiltration phase for the production of an Omega section.

After arrangement of the tube 3 on the Omega section-shaped fiber preform 37 with mold core 36, the tube-encased fiber preform/mold core unit 39 is arranged in a large, cuboid-shaped pressure chamber 38, labelled here as pressure vessel 38 depicted in FIG. 20, which includes a lockable opening 15 in its lid 15 that may likewise be opened via pressure. The tube-encased fiber preform/mold core unit 39 is connected to the casting-side and riser-side feeder lines 33, 34, analogous to the arrangement depicted in FIG. 13, through the creation of an internal and external, pressure-tight closed system.

FIG. 20 depicts the arrangement of the Omega section-shaped fiber preform 37, including the tubular, elastic overlay 3 in the pressure vessel 38 during the first infiltration phase in order to evacuate the molded fiber preform 37. For this process, the casting-side feeder line 33 is closed and a vacuum is created with the tube 3 via the riser-side feeder line 34.

Pressure levels within the internal and external pressure systems are set according to the first illustrative embodiment depicted in FIG. 4 or the second illustrative embodiment depicted in FIG. 13 respectively. During this process step, the opening 15 in the lid 40 is either open or subject to the application of a specific level of pressure that is higher than the ambient pressure in order to facilitate evacuation.

During evacuation of the fiber preform 37, the tube 3 is pressed firmly to fiber preform 37 and, together with fiber preform 37, firmly pressed against the Omega section-shaped mold core 36 so that, on the one hand, the molding of fiber preform 37 is facilitated and, on the other, all air inclusions are removed from the permeable structure of the fiber preform 37.

Figure 21:
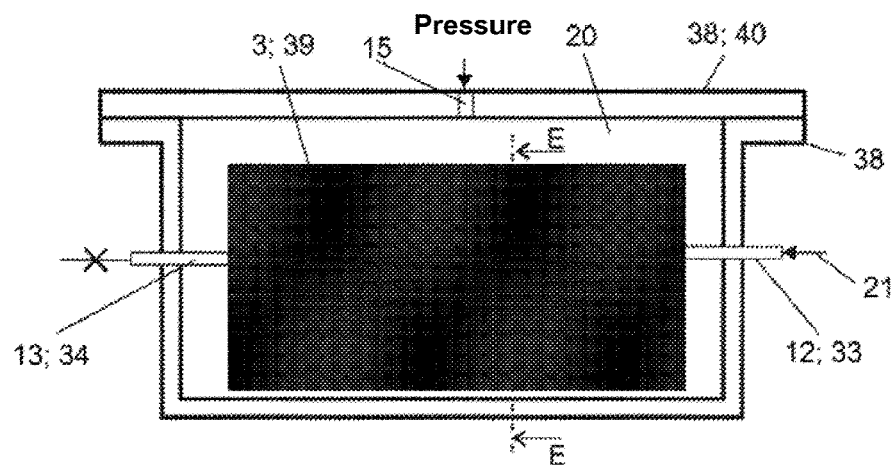
FIG. 21 a sectional view of the arrangement depicted in FIG. 20 during a second infiltration phase.

Following evacuation of the fiber preform 37, the riser-side feeder line is closed depicted in FIG. 21 during a second infiltration phase, and the liquid resin system is conveyed into the internal, pressure-tight system within tube 3 by means of positive pressure in relation to the vacuum and the pressure in the pressure chamber.

The pressure levels within the internal and the external pressure system are set and regulated during the second infiltration phase according to the second illustrative embodiment depicted in FIG. 14.

As a result of the positive pressure in the internal pressure system, the elastic tube 3 is expanded in an area that does not touch mold core 36, whereby a uniform gap 22 is created following the shape of the fiber preform 37 along the entire length of the fiber preform 37, which is filled with matrix material 21 along the entire length of the fiber preform 37.

Figure 22:
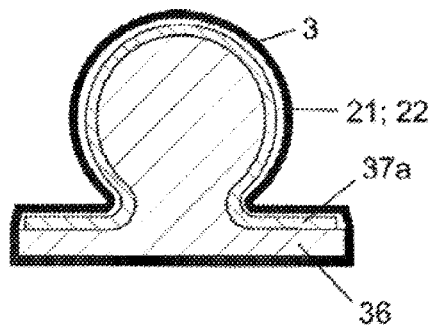
FIG. 22 a cross-sectional view of the fiber preform/mold core unit during the second infiltration phase depicted in FIG. 21.

This process may be seen in more detail in FIG. 22, which depicts the tube-encased fiber preform/mold core unit 39 during the second infiltration phase depicted in FIG. 2 in an enlarged detailed sectional view E-E.

Figure 23:
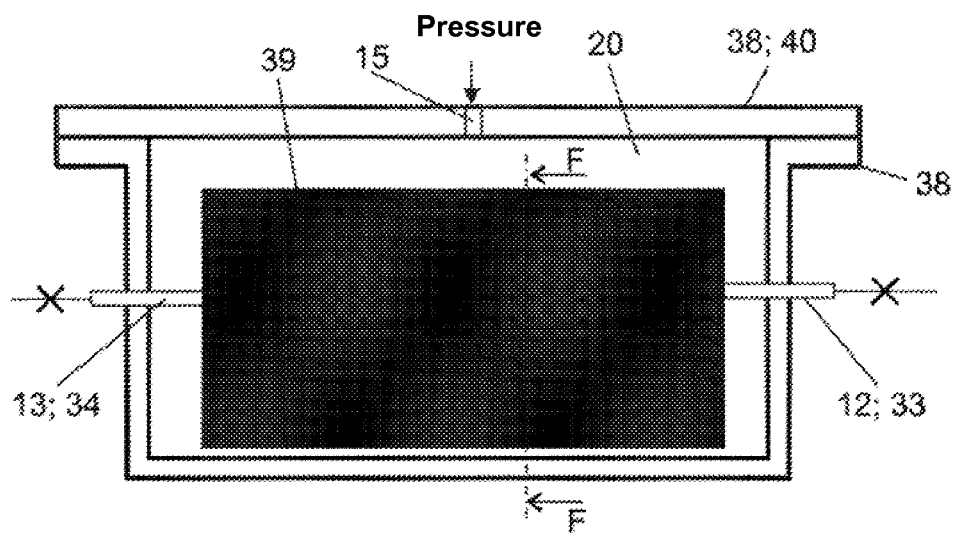
FIG. 23 a sectional view of the arrangement depicted in FIG. 20 during a third infiltration phase.
Figure 24:
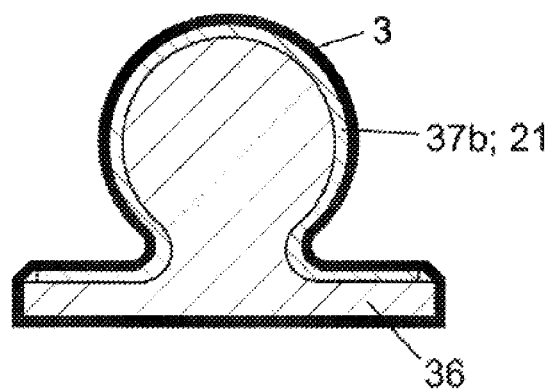
FIG. 24 a cross-sectional view of the fiber preform/mold core unit during the third infiltration phase depicted in FIG. 23.

During a third infiltration phase depicted in FIG. 23, both feeder lines 33, 34 are closed. Positive pressure applied via the opening 15 in the lid 35 of the presser vessel 38 then creates a radially-aligned contraction of the tube 3 until it contacts the Fiber preform/mold core unit 39 along its entire length and the molded fiber preform 37 is uniformly impregnated with matrix material 21 over its entire length radially oriented toward it center. The condition of the tube-encased fiber preform/mold core unit 39 during the third infiltration phase is visible in the cross-section depiction in FIG. 24 (cross-section F-F).

The matrix material 21 in the fiber preform 37 is consolidated whilst still in the pressure vessel 38. After curing, the fiber preform/mold core unit 39 is removed from the de-pressurised pressure vessel 38, tube 3 removed and the finished Omega section made of fiber composite material is de-molded from the mold core 36 (not depicted).

A fourth illustrative embodiment according to FIGS. 25 to 29 describes the method according to the invention and the associated devices for the infiltration of the fiber preform 37 arranged on the Omega section-shaped mold core 36 by means of an elastic overlay 3 connected to the mold core 36.

In order to avoid repetition, only those characteristics and components that differ from the third illustrative embodiment will be described. Please refer to the corresponding process steps and device components described in the preceding illustrative embodiments. Components that are used repeatedly with the same function have the same reference number.

A flat, elastic overlay, for example of silicon, is placed on the mold core 36 including a correspondingly-shaped, dry fiber preform 37. The area of the elastic overlay 3 corresponds to the surface of mold core 36 or that of the fiber preform 37, respectively, and does not need to be expanded.

The elastic overlay 3 covers fiber preform 37 and, in contrast to the illustrative embodiments described above, is directly in contact with mold core 36. The edges of the elastic overlay 3 lie flat on the edge of mold core 36 that is not covered by the fiber preform 37 and are affixed to the mold core 36 in a pressure-tight manner via clamping strips 41.

Figure 25:
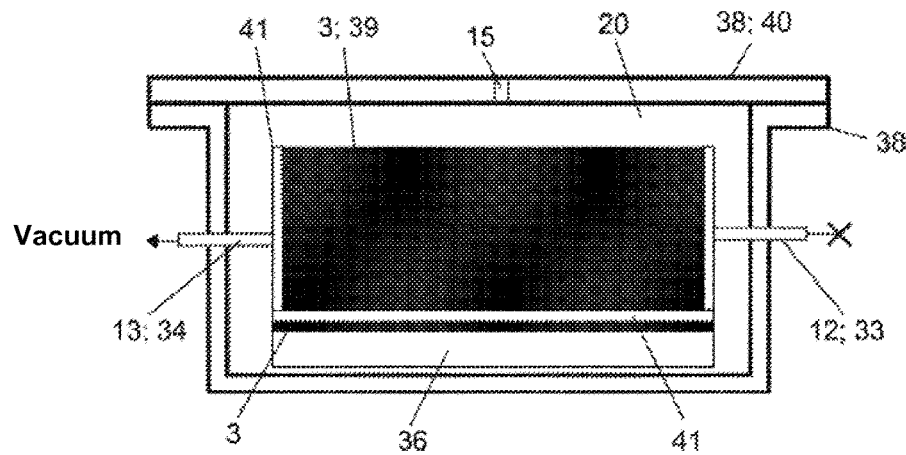
FIG. 25 a sectional view of an arrangement of the fiber perform/mold core unit covered by an elastic, flat overlay within the pressure vessel during a first infiltration phase for the production of an Omega section.

Following application of the elastic overlay 3 to the Omega section-shaped fiber preform 37, the coated 3 fiber preform/mold core unit 39 is arranged in the pressure vessel 38 depicted in FIG. 25.

The coated 3 fiber preform/mold core unit 38 is connected to the casting-side and riser-side feeder lines 33, 34 by creating an internal and external, pressure-tight closed system analogous to the arrangement depicted in FIG. 20.

FIG. 25 depicts the arrangement of the elastic-coated 3 Omega section-shaped fiber preform 37 in the pressure vessel 38 during the first infiltration phase for the evacuation of the molded fiber preform 37.

The processes and pressure levels in the internal and external pressure system during evacuation correspond to those described in the third illustrative embodiment depicted in FIG. 20.

Figure 26:
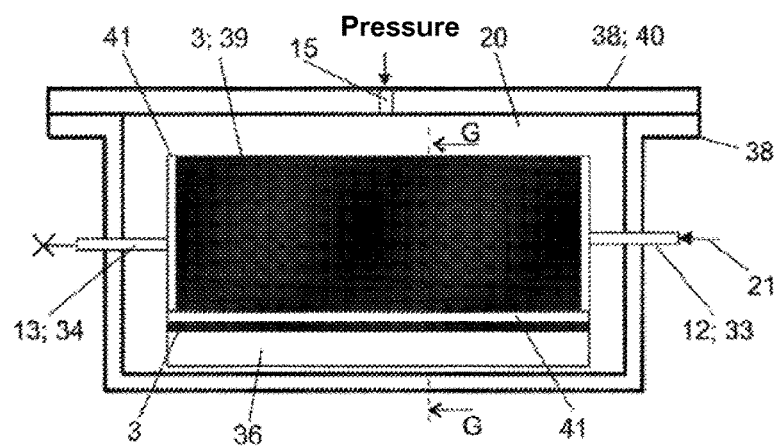
FIG. 26 a sectional view of the arrangement depicted in FIG. 25 during a second infiltration phase.

Following the evacuation of the fiber preform 37, the second infiltration phase follows in pressure vessel 38 depicted in FIG. 26. The process of creating a gap between the fiber preform 37 and the elastic overlay 3, as well as the conveyance of the matrix material 21 into the gap 22, is analogous to the process described during the second infiltration phase according to the third illustrative embodiment. The pressure levels within the internal and the external pressure system are set and regulated during the second infiltration phase according to the second illustrative embodiment according to FIG. 14 or the third illustrative embodiment depicted in FIG. 21 respectively.

Figure 27:
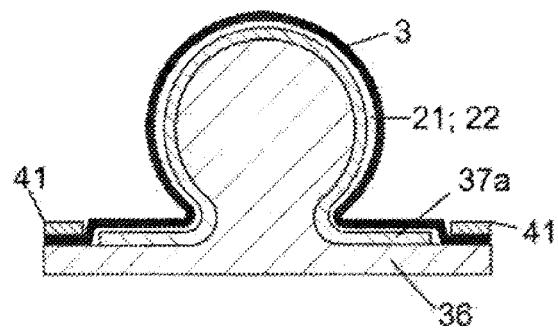
FIG. 27 a cross-sectional view of the fiber preform/mold core unit during the second infiltration phase depicted in FIG. 26.

FIG. 27 depicts the coated 3 fiber preform/mold core unit 39 during the second infiltration phase depicted in FIG. 26 in an enlarged detailed sectional view G-G.

Figure 28:
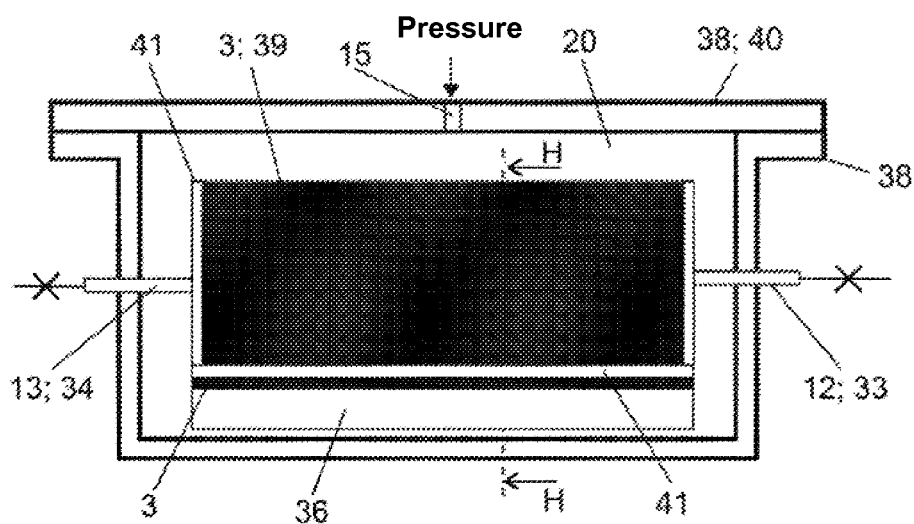
FIG. 28 a sectional view of the arrangement depicted in FIG. 25 during a third infiltration phase.

During the third infiltration phase depicted in FIG. 28, the overlay is constricted and the fiber preform is impregnated under the application of pressure analogous to the process described during the third infiltration phase according to the third illustrative embodiment.

Figure 29:
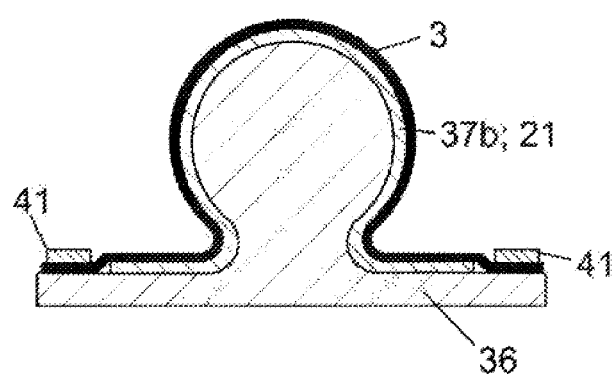
FIG. 29 a cross-sectional view of the fiber preform/mold core unit during the third infiltration phase depicted in FIG. 28.

The condition of the coated fiber preform/mold core unit 39 during the third infiltration phase may be seen in the cross-section representation in FIG. 29 (cross-section H-H).

The matrix material 21 in impregnated fiber preform 37 is consolidated in the pressure chamber 38. After curing, the fiber preform/mold core unit 39 is removed from the pressure vessel 38, the clamping strips 41 and the overlay 3 are removed and the finished Omega section made of fiber composite material is de-molded from mold core 36 (not depicted).

REFERENCE NUMBER INDEX

1 Rod-shaped fiber preform, a dry, b impregnated
2 Dimensionally stable core element
3 Elastic overlay, tubular, elastic overlay, elastic tube
4 Intake device
5 Auxiliary body, hollow section, tubular
6 Intake cone
7 Hose clamp
8 Casting-side connecting pieces, three-piece
9 Riser-side connecting pieces, three-piece
10 Conical base of the connecting piece
11 Conical base of the connecting piece
12 Casting line
13 Riser line
14 Tubular pressure chamber
15 Lockable opening of the pressure chamber
16 Conical top section of the connecting piece
17 Conical top section of the connecting piece
18 Connecting piece tensioner
19 Connecting piece tensioner
20 Pressure chamber
21 Matrix material
22 Gap
23 Rod-shaped fiber preform, a dry, b impregnated
24 Mold, cylindrical mold core
25 Cylindrical pressure chamber
26 Flexible core element
27 Casting-side connecting pieces, two-piece
28 Riser-side connecting pieces, two-piece
29 Cylindrical base of the connecting piece
30 Cylindrical base of the connecting piece
31 Upper section of the connecting piece, hose clamp
32 Spiral groove
33 Casting-side feeder line
34 Riser-side feeder line
35 Pressure chamber lid
36 Mold, Omega section-shaped mold core
37 Omega section-shaped fiber preform, a dry, b impregnated
38 Large pressure chamber, pressure vessel
39 Fiber preform/mold core unit with overlay/tube
40 Pressure vessel lid
41 Clamping strip

What is claimed is:

1. A method of infiltrating with a matrix material a fiber preform for a component of fiber composite material, wherein the method comprises:
   (a) applying an elastic overlay to the fiber preform, the fiber preform being dry,
   (b) expanding the elastic overlay by creating an unoccupied gap that surrounds the fiber preform between a surface of the fiber preform and the elastic overlay,
   (c) introducing the matrix material directly into the unoccupied gap through a casting line which comprises a casting-line connection piece connected to the elastic overlay to distribute the matrix material over the surface of the fiber preform, and
   (d) thereafter pressing the elastic overlay onto the fiber preform to cause the matrix material to infiltrate the fiber preform, wherein a tubular, elastic overlay is used, and wherein the tubular elastic tube is applied to the fiber preform such that the elastic tube is drawn over a hollow-profile auxiliary body.

2. The method of claim 1, wherein an internal, pressure-tight closed system for generating pressure in the region between the overlay and the fiber preform is created between the fiber preform and the overlay.

3. The method of claim 2, wherein prior to introduction of matrix material into the unoccupied gap, the fiber preform is evacuated by the internal pressure system.

4. The method of claim 1, wherein an external, pressure-tight closed system is created between a pressure chamber and the overlay.

5. The method of claim 1, wherein the unoccupied gap between the fiber preform and the overlay is created such that positive pressure is established in an internal, pressure-tight closed system in relation to a pressure in an external, pressure-tight system.

6. The method of claim 1, wherein the elastic overlay is pressed onto the fiber preform by creating a positive pressure in an external, pressure-tight closed system in relation to a pressure in an internal, pressure-tight closed system.

7. A method of infiltrating with a matrix material a fiber preform for a component of fiber composite material, wherein the method comprises:
   (a) surrounding the fiber preform with an elastic overlay,
   (b) expanding the elastic overlay by creating an unoccupied gap that surrounds the fiber preform between a surface of the fiber preform and the overlay,
   (c) introducing the matrix material directly into the unoccupied gap and distributing the matrix material 360° over the surface of the fiber preform, and
   (d) thereafter pressing the elastic overlay onto the fiber preform to cause the matrix material to infiltrate the fiber preform, wherein a tubular, elastic overlay is used, and wherein the elastic tube is applied to the fiber preform such that the elastic tube is drawn over a hollow-profile auxiliary body.

8. The method of claim 7, wherein the fiber preform is introduced into a clear opening of the auxiliary body.

9. The method of claim 7, wherein the fiber preform over which the overlay has been placed is placed on a mold core prior to expanding of the overlay.

10. The method of claim 7, wherein the fiber preform is placed on a mold core prior to placing the elastic overlay on the fiber preform.

11. The method of claim 10, wherein the overlay connected to the mold core has a pressure-tight connection to the mold core.

12. The method of claim 7, wherein the fiber preform is arranged in the tubular, elastic overlay by means of an intake device.

13. The method of claim 12, wherein the intake device has a hollow-profile-shaped auxiliary body.

14. The method of claim 7, wherein an external, pressure-tight closed system is created between a pressure chamber and the overlay.

15. The method of claim 7, wherein the unoccupied gap between the fiber preform and the overlay is created such that positive pressure is established in an internal, pressure-tight closed system in relation to a pressure in an external, pressure-tight system.

16. The method of claim 7, wherein the elastic overlay is pressed onto the fiber preform by creating a positive pressure in an external, pressure-tight closed system in relation to a pressure in an internal, pressure-tight closed system.

17. The method of claim 7, wherein the fiber preform is rod-shaped.

18. The method of claim 17, wherein prior to (b) the preform is wound onto a cylindrical mold core.

19. The method of claim 18, wherein the cylindrical mold core comprises a spiral-shaped groove so that a shape of the wound fiber preform is fit to a shape of a coil spring.

20. The method of claim 7, wherein the method is used to produce a coil spring.

* * * * *